United States Patent [19]

Treat et al.

[11] Patent Number: 5,286,317
[45] Date of Patent: Feb. 15, 1994

[54] ROTARY DIE CUTTING MECHANISM

[75] Inventors: Douglas Treat, Concord; Raymond Jorgenson, Ossipee, both of N.H.

[73] Assignee: Computyre Inc., St. Paul, Minn.

[21] Appl. No.: 934,641

[22] PCT Filed: Aug. 9, 1991

[86] PCT No.: PCT/US91/05703
§ 371 Date: Sep. 4, 1992
§ 102(e) Date: Sep. 4, 1992

Related U.S. Application Data

[63] Continuation-in-part of Ser. No. 589,381, Sep. 27, 1990, abandoned.

[51] Int. Cl.$^5$ ............................................. B32B 31/00
[52] U.S. Cl. ........................................ 156/64; 83/209; 83/370; 156/248; 156/268; 156/270; 156/353; 156/387
[58] Field of Search ............... 156/268, 248, 353, 387, 156/528, 270, 64, 257, 264, 250, 269, 267, 270, 384, 510, 517; 83/370, 209

[56] References Cited

U.S. PATENT DOCUMENTS

| | | | |
|---|---|---|---|
| Re. 30,628 | 5/1981 | Tokuno et al. | 83/74 |
| 3,965,786 | 6/1976 | D'Luhy | 83/346 |
| 4,549,917 | 10/1985 | Jensen, Jr. | 156/353 |
| 4,661,189 | 4/1987 | Voy et al. | 156/248 |
| 4,719,855 | 1/1988 | Cannon et al. | 101/426 |
| 4,781,090 | 11/1988 | Feldkamper et al. | 83/74 |
| 5,017,257 | 5/1991 | Murphy | 156/268 |

*Primary Examiner*—David A. Simmons
*Assistant Examiner*—William J. Matney, Jr.
*Attorney, Agent, or Firm*—Jacobson & Johnson

[57] ABSTRACT

A rotary label die cutting apparatus and process comprises a servo motor driving either a rotary die cutter or its backup roll, preferably the latter, a servo motor driven roll pulling a web carrying uncut label under the die cutter and an electronic processor controlling the relative position and speeds of the die cutter and web through commands to the servo motors with the apparatus including a sensor for observing eye marks on the web and the angular position of the die roll with the apparatus having the unique ability to control the cutting action while the cutting is taking place. to cut labels of different lengths from one die and then return to a home position to await commands for cutting a second label.

14 Claims, 2 Drawing Sheets

ROTARY DIE CUTTING MECHANISM

RELATED PATENT

This application is a continuation in part of Ser. No. 07/589,381, filed Sep. 27, 1990, now abandoned by the present inventors and having the same title.

The disclosure of a patent of the inventors, Limp Label Application Process, U.S. Pat. No. 4,726,865, relates to the present invention in as much as the microprocessor and control mechanism used in the process of the patent and the present process are similar.

BACKGROUND

Rotary die cutters are used commonly on high speed rotary printing presses such as the Mark Andy or Webtron presses to manufacture labels The diameter of the die roll is critical It must match the spacing dictated by the labels to be cut. The gear driving the roll must have a pitch matched to the web speed and this is usually accomplished by a direct mechanical gear drive Each size of label must have its own roll and bringing the machine into register is a somewhat complicated operation requiring usually the services of a skilled—thus expensive—setup person and operator.

A conventional rotary die cutter geared to the speed of the web cannot be timed to correct printing inaccuracies, for example, to die cut on a web that has been printed off-line It cannot be timed to intercept the moving web at a precise point. It is designed for high speed operation and change-over can require considerable effort.

Another method of die cutting labels is to use an intermittent flat bed steel rule die which reciprocates in an up and down motion to cut the labels The web must be stopped while cutting is occurring. Again, to secure uniform cutting across the width and depth of the die requires a skilled setup.

A flat bed die must contact the pressure sensitive material over its entire surface simultaneously and therefore requires considerable pressure. Much time is required to adjust the die head or cutting table to obtain an even cut over the entire die cutting surface Because of the materials used, the die cutter has a limited work life and must be sharpened and/or replaced frequently.

THIS INVENTION

The present invention is addressed to these and other problems associated with the die cutting of pressure sensitive labels and like laminates, especially those where the combination of the label and its carrier web are relatively flexible; i.e., not stiff or rigid. The present invention is a process for rotary die cutting such labels while the web is continuously or intermittently moving. In accordance with the teaching of this invention, the web has a series of eye marks each of which is associated with a particular label. The web carrying the pressure sensitive label is passed sequentially through a rotary die cutting station and then through driven pinch rolls that pull the web continuously through the die cutting station.

As the moving web passes through the two steps, the position of an eye or sensor mark is observed either before or after the die cutting station. Also, the speed of the web is controlled, as for example, by signals taken from the drive roll. These are transmitted to an electronic processor which determines the adjustment, if any, to be required to place the die on the die cutting roll in an exact registration, usually within 0.01 inches or less, with the labels to be cut. This can be done by adjusting the angular position of the die roll relative to the web while the sides of the die are in cutting contact with the label surface and while the ends of the die are still essentially free of the label surface so as to avoid wrinkling of the label or of the waste. Stated differently, the length of the labels can be varied slightly to effect the requisite adjustment. It is preferred, however, to keep the length of the labels the same and to effect the adjustment between labels; i.e., by varying the width of the waste. When running a continuous web, the web may have some stretch or give to it and its length may vary slightly making it desirable to have fine adjustments made to keep in register. This invention permits such adjustments readily to be made.

After the cutting operation is complete, the roll is turned around to a "home position" to be ready for the next cut. The speed of the die roll can be increased to accomplish this as quickly as possible. The speed of the die cutting roll during cutting is dictated by the speed of the web and any corrections and/or any label length versus die length differences.

The rotary die cutting station comprises the die roll and an opposing backup roll with the web traveling there between The die roll has at least one die therein adapted to crush cut the label configuration desired The spacing between the die roll and the backup roll is such that the web is not cut. This spacing may be set by shoulders on the die roll that ride on the backup roll on either side of the web passing between the two. The die roll or the backup roll, preferably the latter, and at least one of the pinch-drive rolls are driven by servo motors responsive to commands from the electronic processor. The use of a driven backup roll simplifies the construction necessary to hold the die roll and permits facile replacement of the die roll. A driven backup roll permits die rolls of various diameters to be used without the need for gears and/or skilled setups.

This invention is particularly applicable to the manufacture of labels which as cut are spaced apart with there being waste in between each label; i.e., the labels are simply not butt cut. The corners of such labels are preferably round.

It is preferred that the observing of the eye mark be done before the rotary die cutting station with the eye mark observed being the one associated with the label being cut. The determination of the adjustment, if any, to be made in the relative position of the die and the adjustment itself can be made in real or background time. That is to say, the adjustment can be commanded while that very same label is being cut, it can be commanded while the die is being returned to its home position, it can be commanded while the die is in contact with the subsequent or any following labels or it can be commanded to occur between labels, the latter being preferred. When the command is issued depends inter alia on the speed of the web, the size of the label, the amount of waste between dies on the roll and whether the die is cutting labels larger or smaller than its length.

The ability to allow and control relative movement between the die and the web while the cutting is occurring is a unique feature of this invention.

Both the speed of the die roll and that of the web can be controlled to control their relative positioning one to another. Because the web with the label stock is pulled through the die cutting station, it is possible to readily vary the length of the label being cut by retarding or accelerating the movement of the die cutting roll relative to the movement of the web during the time of cutting and while the leading and trailing edges of the die are not in contact with the label surface Thus, for example, by retarding the relative motion of the die cutting roll to that of the web the die besides accomplishing the usual crush cutting can be "skidded" or "sliced" through the label, thus increasing the length of the label cut. Consequently, one die roll can be used to cut many various sizes of labels, that is, of different lengths, provided the widths of the labels remain the same for any one die.

A die roll can accommodate different sized die cavities along its length The web simply has to be directed to pass beneath the appropriate die cavity. For example, for a three "lane" die, a web carrying a particular label could be passed through the middle lane for cutting. Thereafter, a web with a different label could be passed through the outside lane.

The process of this invention is particularly adapted to be placed in line with the label printing operation, especially one such as a bar code labeling operation where each label is unique.

In a preferred embodiment the die roll idles on a driven backup roll by means of the rolling contact with their shoulders. Consequently, the diameters of the die rolls can be varied at will with there being only the need to accommodate the spacing between the shafts which can be done, for example, with spring loaded journal boxes for the die roll shaft.

THE DRAWINGS

In the drawings:

In FIGS. 1-3, the same parts have the same numbers.

DESCRIPTION

Figures 1, 2:
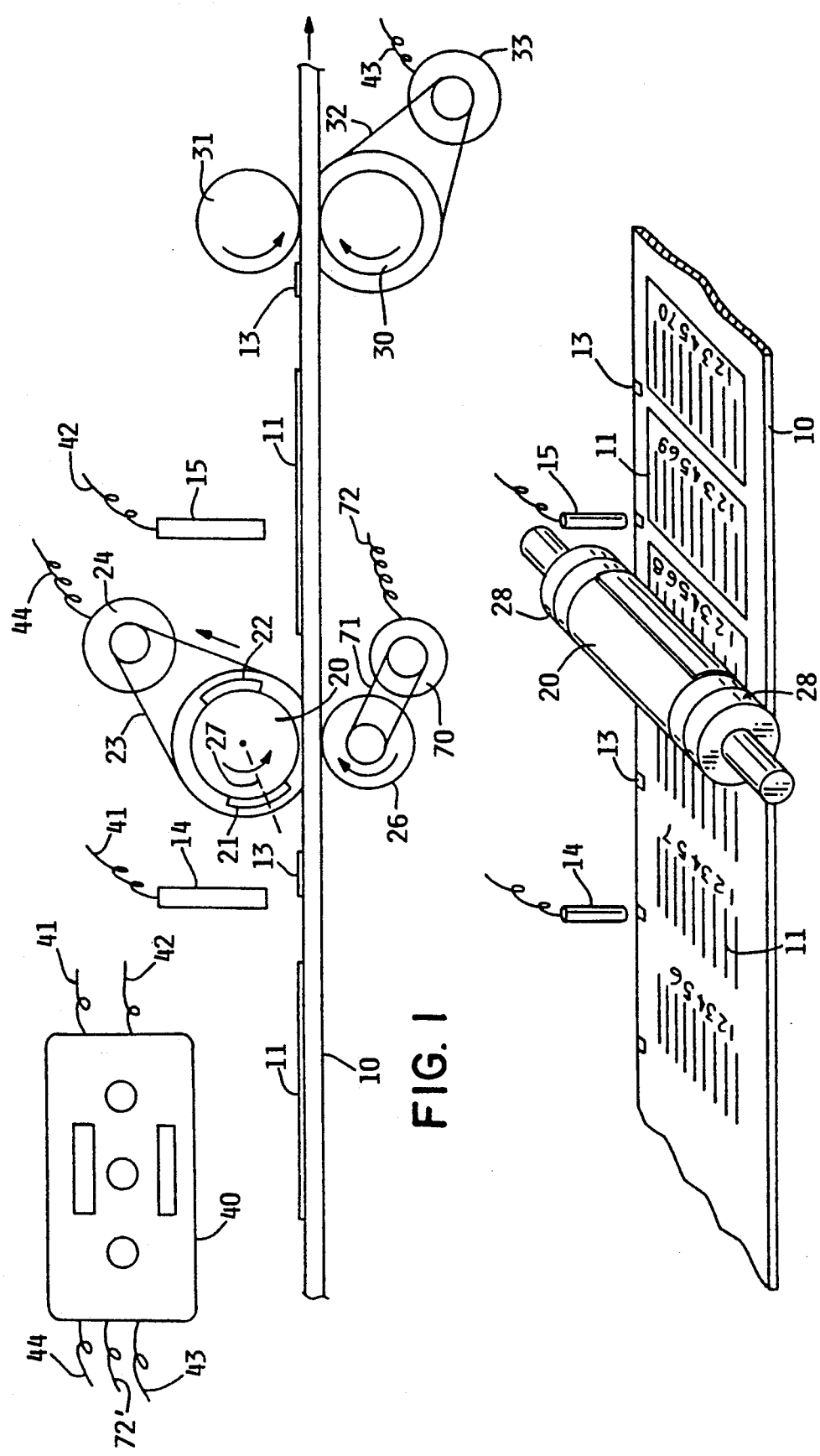
FIG. 1 illustrates in schematic cross section the die cutting process of invention.
FIG. 2 illustrates in a schematic perspective the die cutting steps.

Referring FIGS. 1 and 2, illustrated is a web 10 upon which graphics 11 have been imprinted along with a sensor mark 13. Fiber optic sensors 14 and/or 15 observe the sensor marks.

A die cutting roll 20 carries two dies 21 and 22. Roll 20 may be driven by a timing belt 23 and servo motor 24. However, it is much preferred to drive the backup roll 26 by timing belt 71 and servo motor 70 and have the backup roll drive the die roll. Shoulders on each roll engage one another so that one rotates precisely with the other. If there should be slippage, it is instantly corrected by the procedure of this invention.

The web is pulled through the cutting station by means of a drive roll 30 with associated backup roll 31 which drive roll is driven by a timing belt 32 and servo motor 33.

An electronic processor 40 receives signals from the eye mark sensors 14 and 15 via leads 41 and 42. It also receives from optical encoders connected to servo motors 33 and 24 or 70 via leads 43 and 44 or 70, respectively, information regarding their speed and position The processor can, for example, have a PMAC Motion Control Card or Smart Motion Control Card, Part No. 602090-103 by Delta Tau Data Systems, Inc., Canoga Park, CA.

The end of the die roll 20 can have a magnetic implant or mark which can be read by a magnetic proximity sensor. This is a highly accurate measurement and gives besides a "once around" indication, the position of the die roll even though it has slipped or has been initially misplaced. The magnetic marker can be, for example, in line with the leading edge of a die. If there are several dies on a roll, the leading edge of each can be marked with such a magnetic marker. When the die roll is not the driven roll, the position of the die roll cannot with certainty be determined from the position of the backup roll as given by its optical encoder. The use of a magnetic marker overcomes this problem. The signals sent to controller 40 enables it to determine the speed of web 10 and establishes a time to begin moving the die cutter roll 20 via servo motor 24 or 70 so as to intercept the image 11 printed on web 10 at the precise desired location. In operation after cutting is complete the die cutter continues to cycle until it reaches a home position usually at approximately 7 o'clock as shown by dash line 27. It then rests until it is activated to make the next cut. Preferably, the speed of the die cutter roll after cutting is completed is increased by commands from the processor 40 to return to the home position as quickly as possible.

In the present invention it is preferred that the eye mark associated with the label being cut be observed before the cutting roll. One is observing a moving target that tells you whether or not what you are doing at that precise moment is correct or not and if not, adjustment can be subsequently made and in some instances made while cutting is occurring.

The adjustment during cutting must be made while only the sides of the die cutter are in contact so that the web and die can move relative one to another. If the leading or trailing edges of the die are in contact with the label surface then wrinkling of the label or of the waste may occur.

As control can occur while the sides of the die are in contact with the label, this permits the length of the label being cut to be controlled at will by either at that moment speeding up or slowing down the motion of the die cutting roll relative to that of the web by control of the die and/or web speed. This is permitted in as much as the web is being pulled through the die cutting station and the web remains continuous as it leaves the die cutting station in contrast to some label processes where each label is severed or simply butt cut by a cutting die.

This technique avoids having to change die rolls when one simply wants to change the length of the label.

To phrase this advantage of this invention somewhat differently, the electronic control and processing of the information provided by the eye mark sensors and optical encoders coupled to the servo motors permits controlling the position and speed of the die cutting roll relative to that of the web while in cutting contact within a few degrees of rotation whereas in prior art devices such control had to be accomplished during the time the die was not in contact with the web.

Consequently, only a few die cutting rolls having dies of various widths need be stocked to be able to cut an infinite variety of labels of different widths and lengths As an example, a die roll of two inches diameter has been made carrying two dies, one ¾ inches wide by 1¾ long and the other 3 inches wide by 5 inches long, and has been used to cut labels of various lengths.

Figure 4:
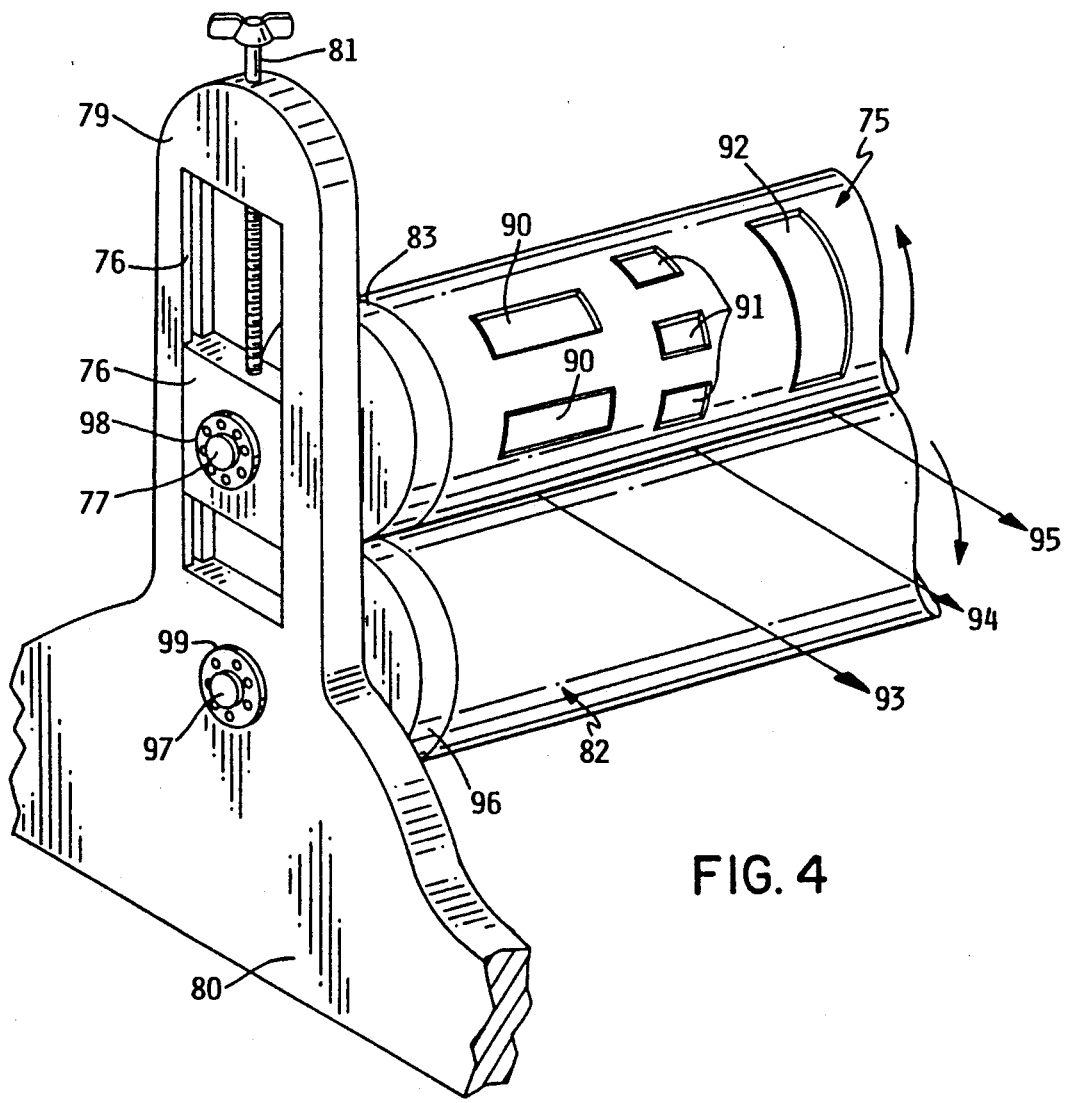
FIG. 4 is a partial showing of a die roll carrying a series of different sized dies along its length and mounted to be driven by the backup roll.

For a preferred embodiment, as shown in FIG. 4, where the backup roll drives the die roll 75, the die roll can be exchanged quite readily without the need to engage drive gears or belts. All that is required is a hold down mechanism that is adequate to accommodate rolls of different diameters. As illustrated, a bearing block 76 holds the shaft 77 of the die roll 75. The bearing block 76 is held in grooves 78 in a guide 79 which is attached to the frame 80 of the machine An adjustable screw 81 holds the shoulders 83 of the bearing block 76 firmly down on the corresponding shoulder 96 of the backup roll. Shaft 77 and shaft 97 of backup 82 are carried in roller bearings 98 and 99 respectively.

The spacing of the die cutting wheel from the backup roll 82 is set by means of shoulders 83 and/or 96. Most label stocks have the same thickness and the height of the shoulders can be accurately set to be that of the thickness of the die plus the thickness of the web such that the die will cut the label but will not appreciably penetrate into the web. This spacing is such that when the die is not in contact with the web the web can be pulled through the gap between the background of the die cutting roll and the backup roll by pinch rolls at a speed faster than that given by rolls 75 and 82, if so desired. Those skilled in the art will appreciate that the use of shoulders 83 and 96 permit easy and quick change over without the need of skilled, expensive operators.

Die roll 75 carries along its length three sizes of dies 90, 91 and 92. Any one of the sizes can be brought into play simply by positioning the web along one of the paths indicated by arrows 93, 94 and 95.

There is no limit to the size of the die roll, although a larger size roll will have more angular momentum which would have to be considered. Preferably, as many dies as possible should be carried by the die roll. If the curvature of the die roll is not sufficient to allow the needed clearances for the leading and trailing edges of the die, it is a simple matter to bend or pass the web around the back up roll to increase the spacings.

Figure 3:
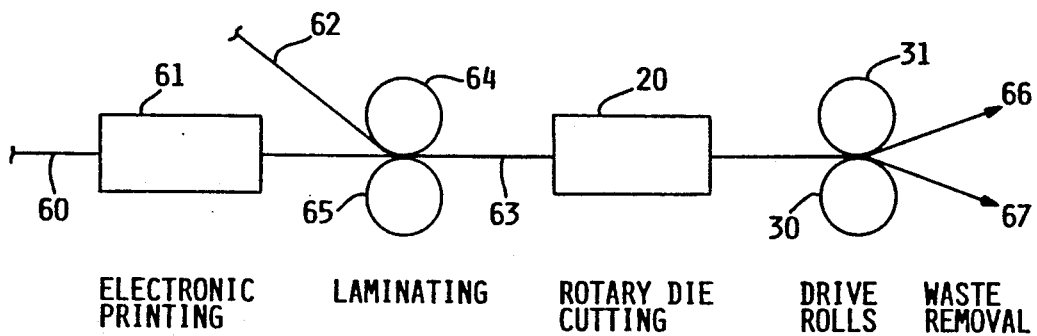
FIG. 3 shows schematically a preferred process wherein labels are printed, die cut and the waste stripped in one continuous operation.

Turning to FIG. 3, shown is a web 60 carrying a label stock and passing first through an electronic printing station 61 such as a Zebra Model 130, Zebra Technology, Vernon Hills, Ill. The printed labels, such as bar code labels, then pass through laminating rolls 64 and 65 and have applied a protective coat of a plastic film 62. Thereafter, the labels are cut as above described at station 20. The web is moved through these steps by drive rolls 31 and 32. Following the drive rolls, the waste 66 is removed, pulled off and passed to a windup roll (not shown) while the cut labels on the web are passed at 67 to a wind up roll (not shown.)

The sensing of an eye mark with resultant control of the die wheel (and/or web) to effect registration is applicable to other similar operations such as printing. For example, if the die (or dies) on the roll are replaced with a printing plate (or plates), multicolor printing can be accomplished with each printing roll being independently driven by a servo motor and with regulation of each color being secured by observation of an eye mark and having the electronic processor control the servo motor operating each color roll as it is returned to the home position.

What is claimed is:

1. A process for rotary die cutting a series of labels carried on a web, said web having a series of eye marks thereon each of said eye marks being associated with a particular label, comprising:
   passing said web sequentially through a rotary die cutting station having:
   a. a die cutting roll carrying a label cutting die thereon with said die cutting roll having a home position; and a backup roll bearing against said die cutting roll, either of which is driven; and
   b. a driven pinch roll that pulls said web continuously through said rotary die cutting station;
   observing a eye mark and an angular position of said label cutting die;
   transmitting said observations to an electronic processor;
   determining by means of said electronic processor the adjustment, if any, required to position said label cutting die as desired relative to said web;
   commanding said adjustment by changing the speed of said web with respect to the speed of said die cutting roll during cutting or prior to cutting by changing the speed of the driven pinch roll that pulls the web through the die cutting roll; and
   returning said die cutting roll to the home position after making a cut 2. The process of claim 1 wherein said commanding is effected by adjusting the angular position of said die cutting roll relative to said web to so position said label cutting die while a side of said label cutting die are in contact with said web and while an end of the label cutting die is essentially free of the web.

3. The process of claim 1 wherein said rotary die cutting station includes an opposing backup roll with said web traveling between, said die cutting roll and said opposing backup roll, said die cutting roll having at least one die thereon adapted to cut a label from a label stock on said web and said driven pinch roll and said die cutting roll each being driven responsive to commands from said electronic processor.

4. The process of claim 1 wherein said label as cut are spaced apart with there being waste between each label, wherein a corner of the labels are round and wherein said adjustment is effected by changing a width of said waste.

5. The process of claim 2 where a tangential speed of said die cutting roll is either faster or slower than a surface speed of a label stock on said web to control a length of the label being cut with said tangential speed being controllable.

6. The process of claim 1 wherein said labels are pressure sensitive labels and said die cutting station is preceded by an electronic printing station printing bar codes which are unique for each of the labels being cut.

7. The process of claim 1 wherein said die cutting roll has shoulders on either side of the die cutting roll that contact said backup roll and space the die cutting roll and the backup roll apart such that when said label cutting die is not in contact with said web or the label stock thereon, said web and said label stock can be pulled freely between said die cutting roll and said backup roll.

8. Apparatus for die cutting a series of labels comprising in combination:
   first means for preparing a web carrying a label stock having printed thereon labels and eye marks;
   a rotary die cutter having a label cutting die thereon;
   a backup roll bearing against said rotary die cutter;

a driven roll pulling said web past said rotary die cutter;

motor means driving said rotary die cutter or said backup roll and said driven roll;

sensor means for observing said eye marks and the speed of said web; and an electronic processor receiving the observations provided by said sensor means, determining the adjustment, if any, required to properly position said label cutting die with regard to said labels and commanding said adjustment by issuing control signals to said motor means to increase or decrease the rate said web is pulled through said rotary die cutter.

9. The apparatus of claim 8 wherein said sensor means includes an eye mark sensor and an optical rotary encoder associated with said motor means to observe the position and speed of a motor.

10. The apparatus of claim 9 including a magnetic proximity sensor observing the speed and angular position of said rotary die cutter, there being a magnetic mark on an end of said rotary die cutter.

11. The apparatus of claim 8 wherein said rotary die cutter has a second die thereon.

12. The apparatus of claim 11 wherein the dies on said rotary die cutter are of different sizes.

13. The apparatus of claim 8 wherein either said rotary die cutter or said backup roll, or both, have shoulders which serve to limit a depth of penetration of said label cutting die.

14. The apparatus of claim 8 wherein said first means includes electronic printing means being adapted to print on each label information unique to each label.

* * * * *